Patented Oct. 11, 1938

2,132,592

UNITED STATES PATENT OFFICE 2,132,592

DISPOSAL OF AMMONIA LIQUOR

Joseph H. Wells and Philip J. Wilson, Jr., Pittsburgh, Pa., assignors to Carnegie Steel Company, a corporation of New Jersey No Drawing. Application September 23, 1935, Serial No. 41,831

6 Claims. (Cl. 210—2)

The ammonia liquors obtained in the coking of coal contain much organic matter which has proved objectionable when discharged into water courses, by reason of the tastes, odors and colors it imparts. If the liquor is evaporated and these organic compounds are driven into the air with the steam, the odors may prove objectionable. A great deal of work has been done on the elimination of this organic matter, but the processes developed are often long, expensive to operate, require a large plant, or have other objections.

One of the methods that has been tried is oxidation of the organic compounds with manganese dioxide. For complete destruction of the organic matter it has been necessary to employ the reagent in an acid liquor, the more acid the better. Under this condition the manganese dissolves as it reacts with the organic matter and is lost. This has two objections; first, the high cost of the manganese in the form of the dioxide which renders the process expensive; and second, the objectionable characteristics of the manganese in water supplies. Manganese, even in small amounts, often forms deposits in water distribution systems and eventually the capacity of the pipes will be materially diminished. It also produces black spots on clothes in laundry work.

We have found, however, that it is possible to destroy the greater portion of the organic matter readily by oxidation with manganese dioxide in neutral, or slightly acid solution, or even slightly alkaline. The organic matter which is destroyed includes such intense odor and taste producing substances as phenols, so that the oxidized liquor can be discharged into a stream with much less danger of producing objectionable tastes and odors. At the same time other inorganic compounds such as sulphides or thiosulphates will be destroyed. By oxidizing the solution close to neutrality with manganese dioxide the manganese is reduced to a lower valence but still largely remains insoluble. Only very small amounts are dissolved, insufficient under ordinary conditions to be objectionable in water. The manganese oxide left after oxidation may be recovered for use in ferromanganese blast furnaces.

The acid or alkaline characteristics desired in the solution during oxidation may be defined by the pH. This is preferably between 6.0 and 7.0 for efficient oxidation without causing the solution of any great quantity of manganese. We do not propose to limit ourselves to this range. With increase in the acidity the speed and completeness of the oxidation increases. Under certain conditions, such as when the treated liquor is to be discharged in large rivers or in water which is not used for drinking purposes, the amount of manganese dissolved may not prove objectionable if the pH is lowered to 5.0 or even 4.0. A certain amount of oxidation occurs also when the liquor is alkaline, but in the course of the oxidation the alkalinity is ordinarily reduced as the following discussion will show and the pH of the final solution will be in the proper range for effective purification. Liquors with pH as high as 8.7 have been satisfactorily purified and we therefore propose to carry on the oxidation in the pH range 9.0 to 4.0.

The reactions which occur are not completely understood, but a typical one is as follows:

The oxygen evolved combines with the organic matter. The reaction which occurs when manganese is dissolved is as follows:

This indicates the effect of the acid on the reaction.

In more detail the process we have discovered is as follows: Entrained solid or tarry material is removed from the liquor by any of the well known methods, such as settling or filtration. The clear liquor is then neutralized or made slightly acid with a suitable acid, such as sulphuric or hydrochloric. This liquor is then treated with an excess of manganese dioxide. "Pyrolusite" is the commercial form which has proved most effective. Intimate contact is essential. The treatment may occur in percolating beds through which the liquor is slowly passed. It may take place in agitators in which the liquor and pyrolusite are vigorously mixed until the oxidation is complete. It is usually best to crush the ore, the finer it is the more surface exposed and the more rapid the reaction. Heating the liquor is also important. The reaction proceeds most rapidly at the boiling point, but lower temperatures may be used if desired. When the oxidation is complete the liquor is settled or filtered to remove any suspended manganese ore and then disposed of in any suitable way.

There are alternative methods which can be used for acidification of the liquor. One is to aerate with $CO_2$-containing gases, such as boiler stack gases. Another is to use acid liquors, such as steel plant pickle liquors containing ferrous sulphate for acidification. These methods can be utilized for the treatment of the still waste from the ammonia still containing an excess of lime. The lime by means of the above reagents is neutralized and precipitated as calcium sulphate or calcium carbonate.

Another liquor which can be satisfactorily employed is the ordinary coke plant flushing liquor after removal of the free ammonia in the ammonia still, but before liming. Such a liquor containing the fixed ammonia, largely as ammonium chloride, will be slightly acid. Consequently, if such a liquor is to be treated it may be brought to the proposed pH by merely boiling off any excess ammonia. There is some tendency to form more free ammonia during the course of the reaction:

$$MnO_2 + 2NH_4Cl + H_2O = MnCl_2 + 2NH_4OH + O$$

so that it is usually best to boil this liquor during the course of the oxidation.

A typical example is as follows: A concentrated flushing liquor produced in a coke plant has after distillation in the free ammonia still an organic concentration of 30,000, this being the organic number of the liquor. Since the organic numbers of different liquors are hereinafter also used, it might be best to explain that this is an industrially standardized manner of expressing the concentration of organic matter in liquors. In this connection, reference may be made to the third edition of the "Gas Chemist's Handbook", published by the American Gas Association, wherein the specific details of the test are given on pages 357 and 358. The pH due to the free ammonia left is 8.4. The liquor contains 1.5 grams per liter, hereinafter referred to as g. p. l., of phenol and 75 g. p. l. of ammonium chloride. By treating with a pound of manganese dioxide per gallon the organic is reduced to 3,000. The phenols, thiocyanates, and thiosulphates are completely destroyed. The pH of the purified liquor is 6.7 and only 0.15 gram of manganese has been dissolved per liter of liquor. The remainder of the ore is still undissolved and may be used for further quantities of liquor before the manganese has been sufficiently reduced to discard it.

The organic may be reduced to a lower concentration by further treatment with more manganese dioxide, but the reduction is very slow. It may also be further reduced by acidifying the liquor and again treating with manganese dioxide. In this case, however, the manganese dissolved may run up to as much as one or more g. p. l., a concentration likely to prove too great for discharge of the purified liquor into a river.

The particular liquor to be treated and the conditions or apparatus employed will depend largely on local conditions.

If the oxidation is carried on at pH concentrations of 7.0 or above, practically no manganese will be dissolved. With increasing acidity the manganese in solution increases but under ordinary conditions with a pH concentration as low as 4.0 it will not prove objectionable.

Should the small amount of dissolved manganese prove objectionable under certain conditions, it may be readily removed from the liquor. We have found that if manganese dioxide is boiled with an acidified liquor until the objectionable organic matter has been satisfactorily destroyed, and then the oxidized liquor is made alkaline with lime, soda ash or other alkali, and boiled, all dissolved manganese is precipitated.

The liquor now free of organic matter and manganese is then satisfactory to put into a stream.

The process may be applied to the treatment of ammoniacal coke plant liquors: thus, a concentrated flushing liquor containing 75 g. p. l. of ammonium chloride is distilled in the free ammonia still to remove the free ammonia. The organic of the distilled liquor is 30,000 and the liquor has a pH of 8.4. This liquor is boiled with a pound per gallon of manganese dioxide. The organic is reduced thereby to 3,000 but 0.15 g. p. l. of manganese is dissolved. The oxidized liquor is then limed as in regular coke plant practice and sent to the fixed ammonia still. The final liquor is free of manganese and has a low organic. It can then be discharged into a river.

Another method which we have discovered is to precipitate and recover the manganese as manganese dioxide by blowing the purified liquor, made slightly alkaline, with air. The process is thus of a cyclic nature and the cost of liquor purification is reduced, since the oxidizing agent is recovered in its original form after use for treatment of additional batches of liquor.

A typical illustration is as follows: Flushing liquor concentrated to about 75 g. p. l. ammonium chloride by recirculation in the hydraulic main of the coke oven battery is distilled in the free ammonia still alone to remove the free ammonia, hydrogen sulphide and carbon dioxide. The slightly acid liquor, pH between 5 and 6, is then treated with approximately one pound of pyrolusite per gallon in a steam heated kettle at the boiling point for four hours. The liquor is agitated during this time, and any steam coming off is collected, condensed, and returned to the kettle. The organic concentration which at the start of the oxidation was 28,000 is reduced to 3,300. The liquor is decanted from the unused pyrolusite, brought to a pH of over 8 with lime and blown with air. The precipitated manganese dioxide is settled out, and the liquor filtered through a sand filter to remove the last traces.

This process may be applied not only to the ammoniacal coke plant liquors discussed, but also to waters polluted with tar, benzol or other organic matter in coke and gas plants, or to industrial waste liquors from such sources as oil refineries, or the like.

We claim:

1. A process for treating liquor containing ammonia, ammonium chloride and undesirable organic compounds with manganese dioxide to oxidize said compounds, including boiling the liquor to bring its pH within a range of from 9 to 4, and treating it with manganese dioxide to effect the desired oxidation without material amounts of the manganese dioxide dissolving in the liquor.

2. A process for treating liquor containing ammonia, ammonium chloride and undesirable organic compounds with manganese dioxide to oxidize said compounds, including boiling the liquor to bring its pH within a range of from 9 to 4, and treating it with manganese dioxide to effect the desired oxidation without material amounts of the manganese dioxide dissolving in the liquor, said process including boiling the liquor to maintain its pH within said range.

3. A process for treating liquor containing undesirable organic compounds with manganese dioxide, including maintaining the liquor substantially neutral during the treatment so as to result in oxidation of the undesirable compounds and a reduction in the tendency of the manganese dioxide to dissolve in the liquor, acidifying the liquor and further treating it with manganese dioxide and subsequently alkalizing the liquor and boiling it to precipitate dissolved manganese therefrom.

4. A process for rendering ammoniacal coke plant liquor fit for disposal, including distilling the liquor to remove the free ammonia and bring its pH within a range of from 9 to 4, treating the liquor with manganese dioxide to oxidize organic compounds contained by the liquor, liming the liquor to free the fixed ammonia, and distilling the liquor to completely remove only the ammonia freed by said liming and to precipitate any manganese dissolved in the liquor.

5. A process for treating waste liquors from coke and gas plants, including contacting said liquor with manganese dioxide and constantly maintaining said liquor substantially neutral while in contact with said manganese dioxide so as to result in oxidation of undesirable organic compounds contained by said liquor while materially reducing the tendency of the manganese dioxide to dissolve in said liquor, and thereafter removing said liquor from contact with said manganese dioxide.

6. A process for treating waste liquors from coke and gas plants, including contacting said liquor with manganese dioxide and constantly maintaining said liquor substantially neutral while in contact with said manganese dioxide so as to result in oxidation of undesirable organic compounds contained by said liquor while materially reducing the tendency of the manganese dioxide to dissolve in said liquor, and thereafter removing said liquor from contact with said manganese dioxide, said liquor being maintained with a pH range of from 4 to 9 while in contact with said manganese dioxide.

JOSEPH H. WELLS.
PHILIP J. WILSON, Jr.